United States Patent [19]

Lockhart

[11] Patent Number: 4,462,357

[45] Date of Patent: Jul. 31, 1984

[54] THROTTLE SYSTEM

[75] Inventor: Bruce D. Lockhart, Rochester, Mich.

[73] Assignee: General Motors Corporation, Detroit, Mich.

[21] Appl. No.: 412,508

[22] Filed: Aug. 30, 1982

[51] Int. Cl.³ .......................... F02D 9/08; F02D 11/10
[52] U.S. Cl. ..................................... 123/336; 123/361; 123/442
[58] Field of Search ............... 123/336, 337, 361, 399, 123/350, 351, 352, 403, 442; 180/178, 179

[56] References Cited

U.S. PATENT DOCUMENTS

| | | | |
|---|---|---|---|
| 2,174,062 | 9/1939 | Raesler | 123/336 X |
| 2,724,376 | 11/1955 | Baumheckel | 123/442 X |
| 3,476,205 | 11/1969 | Kato | 123/361 X |
| 3,802,406 | 4/1974 | Mennesson | 123/198 DB |
| 4,367,805 | 1/1983 | Totani et al. | 123/361 |

FOREIGN PATENT DOCUMENTS 3103043 12/1981 Fed. Rep. of Germany .
522228 6/1940 United Kingdom ................ 123/336

OTHER PUBLICATIONS

"Design News", Jan. 21, 1980, pp. 44–45.

*Primary Examiner*—Tony M. Argenbright
*Attorney, Agent, or Firm*—C. K. Veenstra

[57] ABSTRACT

Engine air flow is controlled by principal and supplementary throttles—the principal throttle being positioned by a stepper motor but also having a mechanical linkage to assure at least partial throttle opening when required, and the supplementary throttle being positioned by a mechanical linkage to permit primary control of engine output by the principal throttle while assuring that engine output is minimized when required.

1 Claim, 3 Drawing Figures

THROTTLE SYSTEM

TECHNICAL FIELD

This invention relates to a throttle system combining manual and automatic control of air flow to a combustion engine.

SUMMARY OF THE INVENTION

In a conventional automotive engine, the driver manually operates a linkage connected directly to the engine throttle to control air flow to the engine. For some applications, however, it has been desired to interpose an electronic control system between the operator and the throttle. The electronic control system would open the throttle until the actual engine output equals the engine output commanded by the operator; preferably, for example, the operator would command that the engine produce a certain power output, and the electronic control system would position the throttle to produce the commanded power output.

This invention provides a throttle system in which an electronically controllable motor moves a throttle in response to an operator's commands and in which a direct linkage connection assures that the engine air flow can be controlled as required by the operator in the event the motor should become inoperative.

In a system according to this invention, the engine air induction passage contains principal and supplementary throttles disposed in series. The system also includes a command lever which may be operated, for example, by a vehicle driver to indicate the desired engine output. An electronically controllable motor moves the principal throttle to the position that will produce the engine output indicated by the command lever. A lost motion connection between the command lever and the principal throttle allows the command lever to initiate movement of the principal throttle when wide open throttle engine operation is suddenly required; this connection also allows the operator to at least partially open the principal throttle in the event the stepper motor should fail to operate as required. The command lever is directly linked to the supplementary throttle to completely open the supplementary throttle during initial movement of the command lever and thus allow primary control of the air flow by the principal throttle. The link between the command lever and the supplementary throttle assures that air flow will be minimized when closed throttle engine operation is required. Appropriate controls may be added to allow automatic control of engine speed—for example, highway cruising speed or engine idle speed.

The details as well as other features and advantages of the preferred embodiment of this invention are set forth in the remainder of the specification and are shown in the accompanying drawing.

THE PREFERRED EMBODIMENT

Figure 1:
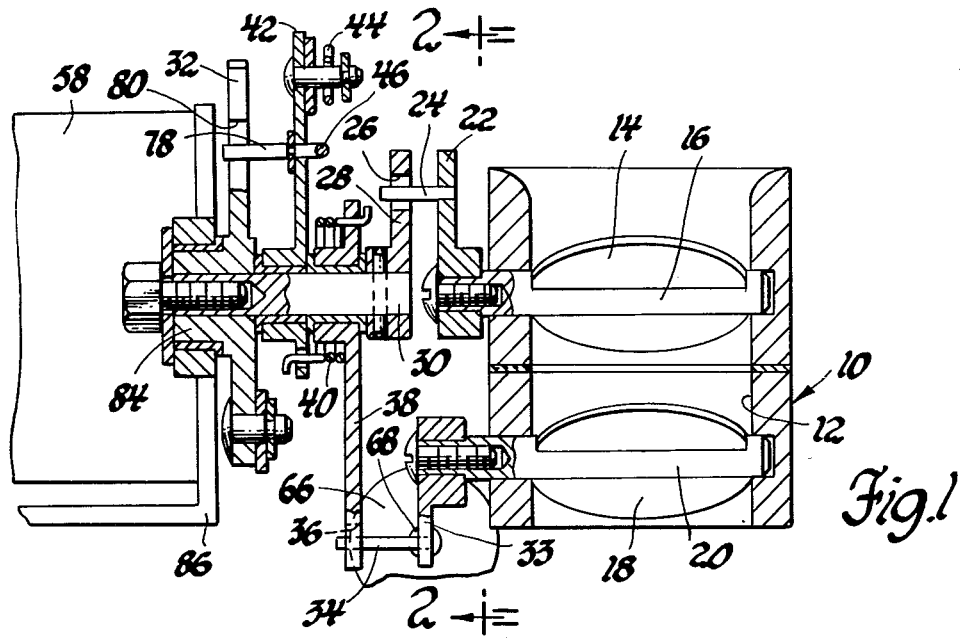
FIG. 1 is an elevation view in partial section of the preferred embodiment of this throttle system.

Referring to the drawing, an automotive internal combustion engine has a throttle body assembly 10 defining an induction passage 12 for combustion air flow to the engine. A principal throttle 14 is supported in induction passage 12 on a shaft 16, and a supplementary throttle 18 is supported in induction passage 12 on a shaft 20. Throttles 14 and 18 provide series control of air flow through induction passage 12.

A principal throttle lever 22 is secured to shaft 16 and has a pin 24 received in a slot 26 of an intermediate lever 28. Intermediate lever 28 is secured on an intermediate shaft 30, and a drive lever 32 is also secured on intermediate shaft 30. A supplementary throttle lever 33 is secured to shaft 20 and has a pin 34 received in a slot 36 of a transfer lever 38. Transfer lever 38 is journalled on intermediate shaft 30 and is connected through a torsion spring 40 to a command lever 42. Command lever 42 is also journalled on intermediate shaft 30 and is biased to the position shown by a coil return spring 44. Command lever 42 is connected through a cable 45 to an operating mechanism such as an automobile accelerator pedal. When the operator desires to increase the engine output, cable 45 pulls command lever 42 clockwise as viewed in FIG. 2; in this embodiment, command lever 42 has about 80° of rotation from a minimum engine output command position through partial engine output command positions to a maximum engine output command position. Command lever 42 operates through torsion spring 40 to rotate transfer lever 38 clockwise as viewed in FIG. 2. Transfer lever 38 then acts through pin 34 to rotate supplementary throttle lever 33 in a clockwise direction to open supplementary throttle 18. In this embodiment, supplementary throttle 18 has about 70° of rotation from a closed position through partially open positions to a wide open position, and supplementary throttle 18 is moved from its closed to its wide open position during approximately the intial 24° of rotation of command lever 42 from its minimum engine output command position; during further rotation of command lever 42, torsion spring 40 winds up to allow transfer lever 38 and supplementary throttle lever 33 to remain stationary.

Figure 3:
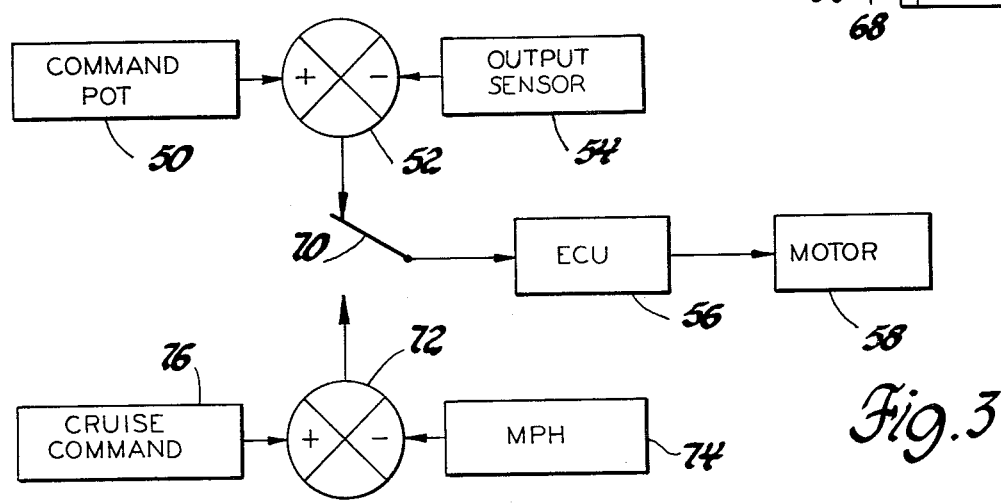
FIG. 3 is a schematic view of an electronic control for operating this throttle system.

As command lever 42 is rotated, a link 46 moves the arm 48 of a command potentiometer 50 which provides an electrical signal indicative of the engine output desired by the operator. A comparator 52 compares that signal with the electrical signal delivered by a sensor 54 (FIG. 3) which indicates the actual engine output. The difference between the signals of command potentiometer 50 and sensor 54 is delivered to an electronic control unit 56 which operates a stepper motor 58 to move principal throttle 14 to the position which will produce the engine output desired by the operator.

Stepper motor 58 has a drive shaft 60 (FIG. 2) with a pinion 62 which meshes with a sector gear 64 on drive lever 32. Thus as stepper motor 58 is driven by electronic control unit 56, lever 32 drives intermediate shaft 30 and intermediate lever 28, pin 24 and principal throttle lever 22 to move principal throttle 14 to the required position. The engine is thereby controlled as commanded by the operator.

When the operator releases the accelerator pedal, return spring 44 pulls command lever 42 counterclockwise and command potentiometer 50 indicates a requirement to return principal throttle 14 to its closed position. Comparator 52, electronic control unit 56 and stepper motor 58 will respond to drive principal throttle 14 to its closed position. Before that can occur, however, torsion spring 40 drives transfer lever 38 and supplementary throttle lever 33 to return supplementary throttle 18 to its closed position. This portion of the throttle system assures that air flow is reduced immediately as required by the operator.

Figure 2:
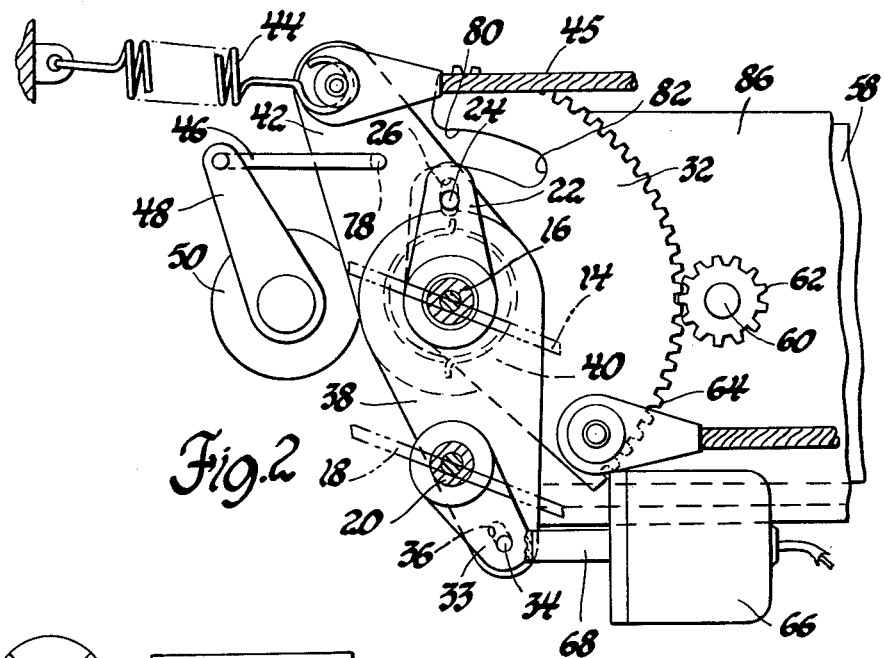
FIG. 2 is a sectional view indicated by the line 2—2 of FIG. 1 showing additional details of the throttle system linkage.

In the closed positions, principal throttle 14 and supplementary throttle 18 cooperate to limit air flow to that required for engine idling. Should an increased engine idling speed be required for cold engine operation or operation of auxiliary vehicle systems, electronic control unit 56 will operate stepper motor 58 to open principal throttle 14. At the same time, electronic control unit 56 will energize a solenoid 66 which has a plunger 68 adapted to push supplementary throttle lever 33 clockwise as shown in FIG. 2, thereby opening supplementary throttle 18 approximately 35° to a position which will allow adequate air flow for fast idle engine operation.

If automatic control of highway cruising speed is required, a switch 70 may transfer control from comparator 52 to a comparator 72 which compares actual vehicle speed from a sensor 74 with the desired vehicle speed from a command module 76. A difference between the desired vehicle speed and the actual vehicle speed causes electronic control unit 56 to operate motor 58 to drive principal throttle 14 to the position providing the air flow required to maintain the desired cruising speed.

During cruise control operation, return spring 44 will hold command lever 42 in its minimum air flow command position. However, electronic control unit 56 will again energize solenoid 66 to again open supplementary throttle 18 approximately 35° to a position which will allow adequate air flow for cruise control operation.

Link 46 has an extension 78 which may enter a slot 80 in drive lever 32. Upon movement of command lever 42 to its maximum engine output command position, extension 78 will engage the end 82 of slot 80 and push drive lever 32 clockwise as shown in FIG. 2. In this embodiment, principal throttle 14 has about 70° of rotation from a closed position through partially open positions to a wide open position, and principal throttle 14 is moved 14° from its closed position during approximately the final 20° of rotation of command lever 42 to its maximum engine output command position. This construction allows command lever 42 to initiate opening of principal throttle 14 when maximum engine output is required by the vehicle operator. In addition, this construction allows command lever 42 to at least partially open principal throttle 14 even in the event stepper motor 58 should become inoperative.

Drive lever 32 has a bushing 84 journalled in a bracket 86 to thereby support drive lever 32, intermediate shaft 30, intermediate lever 28, transfer lever 38 and command lever 42 independently of principal throttle lever 22 and supplementary throttle lever 33. Bracket 86 also supports stepper motor 58 and thereby provides a convenient package which is readily connected to principal throttle lever 22 by way of pin 24 and slot 26 and to supplementary throttle lever 33 by way of pin 34 and slot 36.

With this invention, the engine may be controlled to produce the engine output condition commanded by the operator. For example, the engine may be controlled to produce the speed commanded by the operator or the torque commanded by the operator. Preferably, however, during transient operating conditions this invention is employed to control the engine to produce the power commanded by the operator—command port 50 indicating the power desired by the operator and sensor 54 the power actually produced by the engine. Moreover, it has been recognized that engine air flow is a measure of engine power, and accordingly it is contemplated that sensor 54 would measure the air flow through induction passage 12 as an indication of engine power output.

The embodiments of the invention in which an exclusive property or privilege is claimed are defined as follows:

1. A throttle system for controlling air flow through an engine air induction passage, said throttle system comprising principal and supplementary throttle valves disposed in series in said induction passage, each of said valves being rotatable from a closed position through partially open positions to a wide open position, a principal lever secured to said principal valve and a supplementary lever secured to said supplementary valve, a command lever rotatable from a minimum engine output command position through partial engine output command positions to a maximum engine output command position, electronically controlled means connected to said principal lever and at least at times responsive to rotation of said command lever from one engine output command position to another engine output command position for rotating said principal valve from a position corresponding to said one engine output command position to a position corresponding to said another engine output command position, means adapted to mechanically link said command lever and said principal lever for assuring rotation of said principal valve from its closed position to at least a partially open position in response to rotation of said command lever from a partial engine output command position to its maximum engine output command position, and means mechanically linking said command lever and said supplementary lever for rotating said supplementary valve from its closed position to its wide open position in response to rotation of said command lever from its minimum engine output command position to a partial engine output command position.

* * * * *